United States Patent Office 2,749,318
Patented June 5, 1956

2,749,318

HIGH MOLECULAR WEIGHT SOLID POLYMETHYLENE AND METHOD FOR PREPARING THE SAME

Robert C. Osthoff and Simon W. Kantor, Schenectady, N. Y., assignors to General Electric Company, a corporation of New York No Drawing. Application March 20, 1953,
Serial No. 343,812

2 Claims. (Cl. 260—2)

This invention is concerned with solid high molecular weight polymethylene. More particularly, the invention relates to polymethylene of high tensile strength and high molecular weight obtained by contacting an ether solution of diazomethane with a composition selected from the class consisting of (a) gaseous boron trifluoride and (b) etherates of boron trifluoride.

Polymethylene having the formula $(CH_2)_x$ of molecular weights ranging from about 1,800 to 22,000 have been obtained in the past by contacting, that is by decomposing diazomethane with, for instance, alkyl boron esters or copper powder. [See the work by H. Meerwein, Angew Chem. 60, 78 (1948); G. Buckley et al., J. Chem. Soc. 1950, 2714; and I. Harris J. Polymer Science 8, 353 (1952).] As pointed out above, these products are brittle, of relatively low molecular weight, and additionally, it has been found that the yields obtained using prior methods have been quite unsatisfactory.

Unexpectedly, we have discovered that solid polymers of polymethylene can be obtained in almost quantitative yields and these polymers have molecular weights which are much higher than has heretofore been reported by contacting and decomposing the diazomethane in an ether solution with small amounts of a composition selected from the class consisting of boron trifluoride and etherates of boron trifluoride. For brevity, the boron trifluoride and etherates of boron trifluoride will hereinafter be referred to as "boron compound."

The diazomethane employed in the practice of the invention may be prepared by any method now known in the art. One method comprises the preparation of a diethyl ether solution of diazomethane from N-nitrosomethyl urea, as is more particularly described in "Organic Syntheses" Coll. vol. II, page 165 (1943), published by John Wiley and Sons, New York, N. Y. Preferably the diazomethane is employed in the form of a liquid solution, e. g., in a solvent such as an ether capable of forming an etherate with either the boron trifluoride gas or which is compatible with the boron trifluoride etherate. The concentration of diazomethane in the ether is not critical and may range from about 1 to 20 percent, by weight, of the total weight of the solution. Advantageously, the ether solvent for the diazomethane is one usually employed as the medium in which diazomethane is prepared as, for instance, from the aforesaid N-nitrosomethyl urea. Among such ethers which may be employed as the solvent phase for the diazomethane may be mentioned, for instance, dialkyl ethers, for example, dimethyl ether, diethyl ether, methyl ethyl ether, di-(n-propyl) ether, methyl isopropyl ether, etc. If desired, other liquid ethers free of reactive groups, as for instance methyl aryl ethers, such as anisole, etc., may be employed for the above-stated purpose.

The boron compounds used in the practice of the invention, in addition to boron trifluoride itself, may be the various etherates of boron trifluoride and preferably, though not essentially, the liquid etherates of boron trifluoride. These etherates may be obtained by passing boron trifluoride gas into a liquid ether, for instance, any of those recited above as suitable solvents for the diazomethane. The more commercially available etherates of boron trifluoride include the dimethyl ether etherate of boron trifluoride, the diethyl etherate of boron trifluoride, etc. For optimum results, it is desirable that after the boron trifluoride etherate is obtained, that it be purified, for instance by distillation, to obtain an etherate in as high a state of purity as is possible.

The method for preparing the polymethylene is relatively simple. Generally, all that is necessary is to introduce the boron compound into the solution of the diazomethane. The reaction whereby the polymethylene is formed is almost instantaneous and is accompanied by some degree of violence so that adequate precaution should be taken to maintain satisfactory control of the reaction by carefully controlling the rate of introduction of the boron compound, and the temperature of the reaction mass, which is preferably kept below room temperature and advantageously at temperatures of the order of about $-15°$ to $+5°$ C. If boron trifluoride gas is employed, it is usually only necessary to introduce the gas below the liquid level of the ether solution of the diazomethane for a relatively short period of time. As the boron trifluoride is introduced, it is believed that it reacts with the ether forming the solvent phase of the solution to form the boron trifluoride etherate, and the latter will then effect adequate decomposition of the diazomethane to liberate the solid, high molecular weight polymethylene.

If etherates of boron trifluoride are employed as the decomposition catalyst, it is only necessary to add a few drops of the etherate to the diazomethane solution. Generally, we have found that amounts of boron trifluoride etherate ranging from about 0.01 to 0.1%, by weight, based on the weight of the diazomethane, are adequate for converting the diazomethane to almost quantitative yields of polymethylene. Obviously, larger amounts of the boron compound may be employed without departing from the scope of the invention, but such increased amounts generally do not serve any more useful purpose and may render it more difficult to control the reaction.

In order that those skilled in the art may better understand how the present invention may be practiced, the following example is given by way of illustration and not by way of limitation. All parts are by weight.

EXAMPLE 1

In this example, diazomethane in the form of a diethyl ether solution of the diazomethane was prepared from N-nitrosomethyl urea using the method described in the above-mentioned book "Organic Syntheses." The solution comprised about 10 parts of diazomethane in about 354 parts diethyl ether. To this solution was added about 0.1 part of a freshly distilled boron compound, specifically the diethyl etherate of boron trifluoride [$BF_3.(C_2H_5)_2O$], while maintaining the temperature of the diazomethane solution at around 0° C. Following the addition of the boron compound, an exothermic reaction took place with the liberation of nitrogen and the precipitation of about 5.7 parts of a while, waxy, tough, polymeric solid. Analysis of this solid product (after reprecipitation from hot xylol using methanol as the precipitant, and drying under vacuum to constant weight) showed it to comprise essentially polymethylene as evidenced by the fact that it contained 85.5% carbon and 14.4% hydrogen (theoretical 85.7% carbon and 14.3% hydrogen). Of interest was the fact that analysis of the polymer showed it to contain about 0.1% nitrogen. This polymer was soluble in boiling benzene, toluene, and xylol. The molecular weight of this polymer (which had a flow point of about 185–205° C.) was determined by measuring the intrinsic viscosity of the latter in a xylol solution at 132° C. The molecular weight was found to be about $3.3 \times 10^6$ which is several orders of magnitude greater than that of the polymethylenes previously described as having been obtained from diazomethane. This high molecular weight product was found to have a $d_4^{27}=0.938$ and $d_4^{125}=0.91$. Samples of this polymer were pressed into thin sheets at 230° C. under a pressure of 10,000 p. s. i. Strips of these sheets were tested and found to have a tensile strength of about 4,900 lbs. p. s. i. and an elongation at break of about 500%.

The electrical properties of this polymer were also determined with the results shown in Table I below;

Table I

| Frequency | Percent Power Factor | Dielectric Constant |
|---|---|---|
| 60 | 0.0008 | 2.38 |
| 300 | 0.0003 | 2.38 |
| 1,000 | 0.0001 | 2.38 |

Comparison of the above-identified properties with that of polyethylene revealed the following: the electrical properties of the polymethylene were at least as good as the electrical properties of the polyethylene. However, with respect to the other properties, the properties of the polyethylene were inferior to the properties of the polymethylene described above. Thus, in contrast to the values recited above, polyethylene has a softening point of about 90–100° C., a tensile strength of about 1300 p. s. i., and a per cent elongation at break of about 300. [See Modern Plastics Encyclopedia 1949, published by Plastics Catalogue Corporation, 122 E. 42d. Street, New York 17, N. Y., and the book "Vinyl and Related Polymers" by C. E. Schildknecht (1952) pages 512 et. seq., published by John Wiley and Sons, New York, N. Y.]

It will, of course, be apparent to those skilled in the art that in addition to the diethyl ether solvent for the diazomethane, other solvents therefor, many of which have been mentioned previously, may be employed. Moreover, instead of employing the diethyl ether etherate of boron trifluoride, one may use other etherates of boron trifluoride, or one may employ boron trifluoride itself for the purpose of decomposing the diazomethane to the polymethylene. Obviously, the conditions and proportions employed may be modified widely as will be apparent to those skilled in the art, and no intent is to be read into the foregoing example that the applicants intend to be limited to the conditions described in the aforesaid example.

The molecular weight of the polymethylene may be controlled by the concentration of the boron compound, by the use of different temperatures, by the selection of the boron compound, etc. By means of our process, we are able to obtain solid polymeric products having molecular weights ranging from about 500,000 to as high or even higher than the molecular weight described in the foregoing example. The equation used herein in calculating molecular weights from viscosity is the Harris equation described in J. Polymer Science VIII, 353 (1952).

The polymethylene herein described may be employed in various applications where the solid polyethylene is used. Thus, it may be employed in electrical applications where its improved strength and desirable electrical properties can be utilized, as for instance, as insulators for electrical conductors, as encapsulating means for electrical coils, etc. Because of the good heat resistance of the polymethylene, it can also be used as gaskets, steam and hot water tubing, etc. The solid polymethylene herein described may be formed into solutions or dispersions which can be used for coating purposes of, for instance, various metals whereby advantage can be taken of the desirable heat resistance and chemical stability of the polymethylene coating. The polymeric materials herein described may be used to make containers and receptacles such as bottles, etc., which are presently made from polyethylene, but due to the improved heat resistance of the polymethylene, the objects molded therefrom can be washed or sterilized in hot water or steam to which polyethylene cannot be subjected.

What we claim as new and desire to secure by Letters Patent of the United States is:

1. The process for preparing solid polymethylene having a molecular weight above 500,000 as determined by the Harris equation which comprises contacting at about −15° C. to 5° C. an ether solution of about 1–20% diazomethane, based on weight of total solution, with about 0.01–0.1% of an etherate of boron trifluoride, based on weight of diazomethane.

2. Solid polymethylene having a molecular weight of above 500,000 as determined by the Harris equation produced by a process which comprises contacting at about 0° C. a solution comprising about 10 parts by weight of diazomethane in about 354 parts of diethyl ether with about 0.1 part of the diethyl etherate of boron trifluoride.

References Cited in the file of this patent

UNITED STATES PATENTS

| 2,652,372 | Farlow et al. | Sept. 15, 1953 |
| 2,670,333 | Ray | Feb. 23, 1954 |

OTHER REFERENCES

Kantor et al.; J. A. C. S., vol. 75, Feb., 1953, pp. 931 and 932.

Harris: J. Polymer Science, vol. 8, No. 4, pp. 353, 360 and 361, Apr., 1952.

Mark et al.: Physical Chemistry of High Polymeric Systems, Interscience 1950, pp. 79 to 81.

Meerwein: Angewandte Chemie, A, vol. 60, p. 78, 1948.

Brown et al.: Nature, May 28, 1949, vol. 163, pp. 834 and 835.

Buckley et al.: J. Chem. Soc., Oct., 1950, pp. 2714–2718.

Hill: Fibres from Synthetic Polymers Elsevier, 1953, pp. 52–55.

Fettzin et al.: J. A. C. S., vol. 77, Jan. 5, 1955, pp. 206–210.

Bryant et al.: J. A. C. S., vol. 75, Dec. 20, 1953, pp. 6113–6115.